No. 618,454.
W. T. DAVIS.
VALVE MECHANISM.
(Application filed Jan. 8, 1898.)
(No Model.)
Patented Jan. 31, 1899.
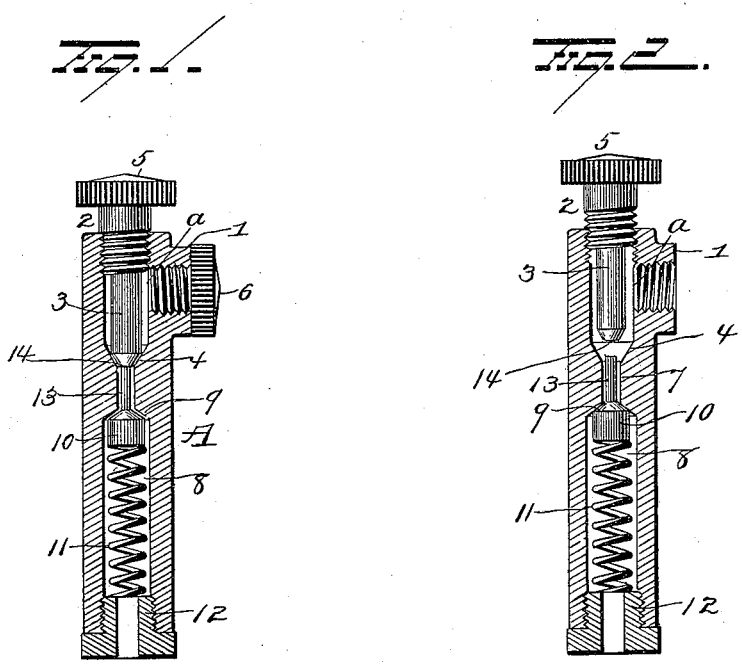
WITNESSES
E. J. Nottingham
G. F. Downing
INVENTOR
W. T. Davis
By H. A. Seymour
Attorney

UNITED STATES PATENT OFFICE.

WILLIAM T. DAVIS, OF BATTLE CREEK, MICHIGAN.

VALVE MECHANISM.

SPECIFICATION forming part of Letters Patent No. 618,454, dated January 31, 1899.

Application filed January 8, 1898. Serial No. 666,097. (No model.)

*To all whom it may concern:*

Be it known that I, WILLIAM T. DAVIS, a resident of Battle Creek, in the county of Calhoun and State of Michigan, have invented certain new and useful Improvements in Valve Mechanism; and I do hereby declare the following to be a full, clear, and exact description of the invention, such as will enable others skilled in the art to which it appertains to make and use the same.

My invention relates to an improvement in valve mechanism, and more particularly to such as are adapted for use with pneumatic tires, the object of the invention being to so construct the valve mechanism that the same can be positively closed before the detachment of the pump or other inflating apparatus.

A further object is to so construct the device that the air-passage can be positively closed independently of the check-valve.

A further object is to construct a valve mechanism in such manner that the air-passage can be opened and closed by means of a valve independent of the check-valve, and so that said first-mentioned valve will maintain the check-valve normally out of contact with its seat, whereby to prevent the sticking of the same.

With these objects in view the invention consists in certain novel features of construction and combinations and arrangements of parts, as hereinafter set forth, and pointed out in the claim.

In the accompanying drawings, Figure 1 is a sectional view showing the parts in their normal positions. Fig. 2 is a similar view showing the positions of the parts when the pump is applied for inflating the tire.

A represents the housing of the valve mechanism, provided with internally-screw-threaded openings at its respective ends and with a lateral opening $a$ in proximity to its outer end, with which opening a laterally-projecting screw-threaded nipple 1 communicates for the attachment of the tube of an air-pump or other inflating apparatus. A valve 2 is screwed into the outer end of the housing and made with a contracted portion or stem 3, adapted to normally rest on a valve-seat 4 within the housing at a point below the nipple 1. The valve 2 is provided at its outer end with a suitable thumb-wheel 5, whereby it can be readily manipulated, and the nipple 1 is normally closed by means of a screw-threaded plug 6, also provided with a suitable thumb-piece to permit it to be readily removed and replaced by the operator. A duct 7 extends downwardly and communicates with a larger air-passage 8, and at the juncture of said duct and air-passage a seat 9 is formed for a check-valve 10. The check-valve 10 is pressed normally toward its seat by means of a spring 11, disposed within the air-passage 8, said spring bearing at its respective ends against the check-valve and against a hollow or tubular nipple 12, inserted in the inner end of the housing. In order to prevent the check-valve from normally bearing against its seat and sticking there, said check-valve is provided with a stem 13, which projects up through the contracted duct 7 and engages the end 14 of the valve 2, by which it is pressed downwardly when said valve 2 is in its normal position, and thus the check-valve is kept normally away from its seat.

Assuming now that it is desired to inflate the tire to which my improved valve mechanism is attached, the operator will first remove the plug 6, and the tube of the air-pump will then be attached to the nipple 1, said nipple being located (as before mentioned) at the side of the housing, where the operator can more readily apply the pump-pipe than he could if said nipple be located at the end of the housing, as has heretofore been the custom. Although the pump has been attached to the housing, the air-passage therethrough is still closed by the valve 2. The operator will now unscrew the valve 2 sufficiently to permit the check-valve to become seated. The air-pump can now be operated to force air through the housing and into the tire in the usual manner, the check-valve serving to automatically open and close the air-passage as the pump is operated. When the tire shall have been sufficiently inflated, the operator will first screw the valve 2 down upon its seat, so as to close the air-passage through the housing, after which he will remove the pump-tube and then insert the plug 6 into the nipple 1.

My improvements are very simple in construction, cheap to manufacture, enable the operator to positively close the air-passage before or during the application and removal of the pump and independently thereof, and are effectual in all respects in the performance of their functions.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent is,—

The combination of a valve-casing consisting of a single tube having the opening therethrough contracted at a point between its ends so as to form communicating chambers having valve-seats at their adjacent ends, a removable valve screwing into the outer end of one of said chambers and bearing normally on the valve-seat at the inner end thereof, a threaded nipple on the side of said tube or casing and communicating with said last-mentioned valve-chamber, a solid plug for said nipple, a check-valve in the other chamber, a spring normally tending to press the check-valve against the seat in the chamber in which it is located, and a stem projecting from the check-valve and through the contracted space between the valve-seats so as to be normally engaged by said first-mentioned removable valve to maintain the check-valve normally away from its seat, substantially as set forth.

In testimony whereof I have signed this specification in the presence of two subscribing witnesses.

WILLIAM T. DAVIS.

Witnesses:
J. H. GREEN,
O. S. CLARK.